United States Patent [19]
Nagels

[11] 4,049,502
[45] Sept. 20, 1977

[54] METHOD OF AND APPARATUS FOR DISTILLING OF LIQUIDS

[75] Inventor: Günther Nagels, Bramstedt, Wesermunde, Germany

[73] Assignee: Klockner-Werke AG, Duisburg, Germany

[21] Appl. No.: 505,950

[22] Filed: Sept. 13, 1974

[30] Foreign Application Priority Data

Sept. 14, 1973 Germany .............................. 2346276
June 26, 1974 Germany .............................. 2430711

[51] Int. Cl.² ............................................... B01D 3/02
[52] U.S. Cl. ........................................ 203/10; 203/95; 203/DIG. 18; 203/DIG. 8; 202/206; 203/DIG. 16; 266/190; 75/41
[58] Field of Search .................. 202/235, 206; 203/10, 203/11, DIG. 16, DIG. 20, 96, 1-3, 95, DIG. 18, DIG. 8; 159/47 WL, DIG. 32; 75/41; 266/190

[56] References Cited

U.S. PATENT DOCUMENTS

| | | | |
|---|---|---|---|
| 2,993,753 | 7/1961 | Collins, Jr. | 159/47 WL |
| 3,183,145 | 5/1965 | Collins, Jr. | 159/47 WL |
| 3,213,001 | 10/1965 | Schmidt | 202/235 |
| 3,243,359 | 3/1966 | Schmidt | 203/10 |
| 3,412,558 | 11/1968 | Starmer | 203/11 |
| 3,467,587 | 9/1969 | Connell | 203/DIG. 20 |
| 3,476,653 | 11/1969 | Doland | 203/11 |
| 3,587,488 | 6/1971 | Mutke | 159/DIG. 32 |
| 3,664,307 | 5/1972 | Rawdon | 122/1 R |
| 3,677,905 | 7/1972 | Brown | 203/DIG. 20 |
| 3,928,145 | 9/1974 | Othmer | 159/1 S |

OTHER PUBLICATIONS

Websters New World Dictionary of the American Language College Ed., World Pub. Co., N. Y., 1968, p. 588.

*Primary Examiner*—Hiram H. Bernstein
*Attorney, Agent, or Firm*—Michael J. Striker

[57] ABSTRACT

The steam which develops during water cooling of a furnace is withdrawn from the cooling system of the furnace, introduced into a distillation plant wherein it is subjected to at least partial condensation, and the thus-obtained condensate is recirculated into the cooling system of the furnace. An apparatus for carrying out the method is also disclosed.

9 Claims, 6 Drawing Figures

METHOD OF AND APPARATUS FOR DISTILLING OF LIQUIDS

BACKGROUND OF THE INVENTION

The present invention relates generally to the distillation of liquids, such as water and aqueous solutions, and in particular to a method of effecting such distillation and to an apparatus for carrying out the method.

Distillation equipment for distilling water, for instance for producing drinking water from seawater, is well known and is for instance widely used in shipboard applications. Such equipment is either operated with waste steam of the ship's turbine or with waste heat of ship's diesel engines which serve to drive the ship. This type of equipment is in form of small installations which frequently have only a single evaporation stage. They are simple to operate and can be controlled without any complications at all.

However, it is well known that distillation equipment operates completely without problems only under certain specific operating conditions. These depend upon the temperature of the heat exchange medium, the working pressure and other circumstances, which in turn determine the speed of evaporation of the liquid to be distilled. This speed of evaporation in turn largely determines the quality of the distillate obtained.

It is also known from the prior art to supply the distillation system with auxiliary steam to maintain the amount of steam that is being supplied at a constant level, if the main amount of steam may vary as a result of variations in the operation of a ship's turbine.

Further, it is known if drinking water is to be produced from seawater on a large scale, to employ the waste heat of nuclear reactions which are used in nuclear power plants to produce electrical energy. The steam produced by the heat of the nuclear reactor is supplied to turbines wherein it produces electrical energy, and the waste steam from these turbines, that is the spent steam, is subsequently used for heating a distillation installation which may, for example, operate on the principle of expansive distillation. This approach makes possible an economically feasible production of drinking water from seawater, but at the same time it is subject to substantial difficulties which arise from the fact that distillation systems must be operated with constant amounts of steam. For this reason the steam turbine and distillation system are so constructed in the arrangements using nuclear heat, that both are operated at a predetermined total capacity. When the total energy requirements of the complete arrangement drop below this level, for instance because there is less requirement for electrical energy, then water vapor is directly supplied from the steam boiler to the distillation system, because a reduction in the amount of steam required in distillation systems is as a matter of principle not possible. Further difficulties result from the fact that electrical fluctuations, that is the electrical energy demand, occur quite rapidly and that the amount of steam that is being used in the distillation system cannot be controlled in dependence upon such fluctuations.

Such problems are routinely experienced in all large systems serving for desalinization, production of drinking water from salt water, and similar applications. In fact, in some instances the reasons for the difficulties experienced are not entirely clear. Added to these problems is the fact that the partial pressures in the individual evaporating stages must not deviate too much from one another, because otherwise the phenomenon known as water-hammering will be experienced, which leads to damage to the heat exchangers of the system.

It is also known from the prior art to produce drinking water from salt water by means of solar energy. In this case the aforementioned problems are not experienced, because the water is simply pumped into shallow containers or the like and evaporates from them under the influence of solar heat, to subsequently condense on cooler surfaces. However, this very ancient approach to desalinization and production of drinking water is not suitable for large-scale applications.

All of the aforementioned approaches are suitable for converting contaminated water, such as river water or salt water, into drinking water, water suitable for feeding of boilers, and the like, by means of distillation. It is also known from the prior art to cool a furnace by means of water which is circulated in a closed circuit through a cooling system of the furnace. Heretofore, the steam resulating from this cooling operation was condensed in a surface condenser by means of cooling water or cooling air, and the condensate was returned to the cooling system. However, the heat of condensation is then of course lost, being carried away with the cooling medium.

SUMMARY OF THE INVENTION

It is a general object of the invention to economically operate a distillation system, and to make effective use of the waste heat of a furnace particularly a blast furnace.

The problem thus posed is solved in that the steam resulting from water cooling of a furnace is introduced into a distillation plant wherein its at least partial condensation is effected, with the condensate thus obtained being recirculated into the cooling system of the furnace. The temperature of the condensate is preferably practically the same as that of the steam, so that only the vapor heat is removed from the steam. The steam arriving from the furnace may for instance be low pressure steam at approximately 0.5 atmospheres and a temperature of approximately 110° C. The pressure and temperature values could also be somewhat higher or somewhat lower than the aforementioned values.

A further concept of the invention is to produce an arrangement for carrying out the method, according to which the arrangement incorporates the furnace and the distillation plant, which are connected in circuit with one another by appropriate conduits, so that steam flows from the furnace to the distillation plant, and condensate flows back from the distillation plant to the furnace and through the cooling system of the same.

Added to the problems mentioned earlier in connection with large systems of the prior art, is the fact that the amount of steam which will result from cooling of a furnace can often not be precisely calculated in advance as the furnace is being built. When the furnace subsequently is operated and cooled, deviations of up to 70% from the calculated value are frequently experienced, meaning that the amount of steam that is actually produced may be up to 70% higher or lower than the calculated amount of steam. The reasons for these strong deviations are largely unknown to date.

Because of these difficulties and the fact that many of these phenomena have not yet been satisfactorily examined, the industry has not heretofore considered the possibility of using steam from furnaces for the operation of distillation plants, despite the fact that the need for a large-scale and economical source of heat for such purposes has long existed.

A further concept of the invention is to provide an arrangement for carrying out the novel method, which arrangement makes it possible to take into the account the fact that the amount of steam that can be derived from an erected furnace may widely vary from the calculated amount. Furthermore, damage to the installation plant is to be avoided in the event of sudden breakdown of the furnace, or other difficulties that may be experienced with it.

These problems are solved according to the present invention by connecting the steam chamber of the distillation plant with a steam supply conduit which receives steam from the water cooling system of the furnace, and by connecting the steam chamber further with an independent conduit which is independent of the furnace and which is capable of supplying an amount of additional or auxiliary steam corresponding to the deviation of the actual amount of steam received from the furance from a predetermined quantity.

In this manner it is possible to make proper provision for accommodation of the arrangement to the only approximate theoretical computation of the amount of steam to be available from a furnace, and this is important because as mentioned earlier the distillation plant itself must be operated with an essentially constant amount of steam throughput per unit time.

Furthermore, the invention assures that the distillation plant, which is constructed to produce a certain amount of distilled water per unit time, can be supplied with steam independently of fluctuations in the amount of steam derived from the cooling system of the furnace.

Furthermore, the distillation plant can be started up by means of the auxiliary conduit, it can be continued in operation even though it may be necessary to shut down the furnace which would result in a rapid decrease of the available steam from it, or it can even be continued in its operation without having to fear that the sudden decrease or lack of steam might cause water hammering or other damage to the distillation plant.

To determine the amount of auxiliary steam which is required in the event of deviations of the steam from the furnace from the reference value, the steam supply conduit from the cooling system of the furnace and the auxiliary steam supply conduit each have a pressure and temperature corrected quantity measuring device incorporated in them. The auxiliary amount of steam is derived from the general steam supply system of a plant of which the furnace and the distillation equipment form a part.

Because the steam in this steam supply system is at a higher pressure than the steam derived from the cooling system of the furnace itself, the invention further provides in the auxiliary steam supply conduit a pressure reducing valve and, downstream thereof, a condensate injector.

According to still another embodiment of the invention the steam supply conduit and the condensate recirculating conduit may each have associated with them a shutoff valve, so that in the event the furnace must be shut down the cooling circuit of the furnace cooling system can be separated from the distillation plant and the latter can then be operated exclusively by steam derived from the steam system of the plant itself, that is steam that is supplied via the auxiliary steam supply conduit.

It is advantageous to interpose between the valve in the condensate return conduit and the furnace itself a container from which the condensate is continuously supplied to the furnace cooling system. This condensate container may be connected with the user, that is with the furnace cooling system, by means of appropriate valves, so that, in the event that the distillation system receives steam both from the furnace and from the auxiliary steam supply conduit, excess condensate or distillate can be forwarded to the user.

According to still another concept of the invention that portion of the condensate return conduit which is located between the shutoff valve and the steam chamber of the distillation plant may be connectable by means of an additional valve with a distillation vessel. This arrangement assures that if the distillations plant is operated only by steam from the auxiliary steam supply conduit, the condensate produced in the steam chamber can be supplied into this distillation vessel, in which case the valve in the conduit connecting the chamber with the cooling system of the furnace is closed.

It is further advantageous to provide a shutoff valve in the auxiliary steam supply conduit, which can be closed in the event that the distillation plant is to be operated exclusively with steam derived from the cooling system of the furnace itself.

An auxiliary condenser may be provided for the event that the distillation plant may become inoperative while the furnace is in operation. This would assure sufficient cooling of the furnace since the auxiliary condenser may be connected via appropriate valves with the distillation vessel, in which case the steam of the furnace yields up its heat to the auxiliary condenser and flows via the distillation vessel back to the furnace. A further valve arrangement makes it possible to switch a distillation column into the circuit as a condenser.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRRED EMBODIMENTS

Figure 1:
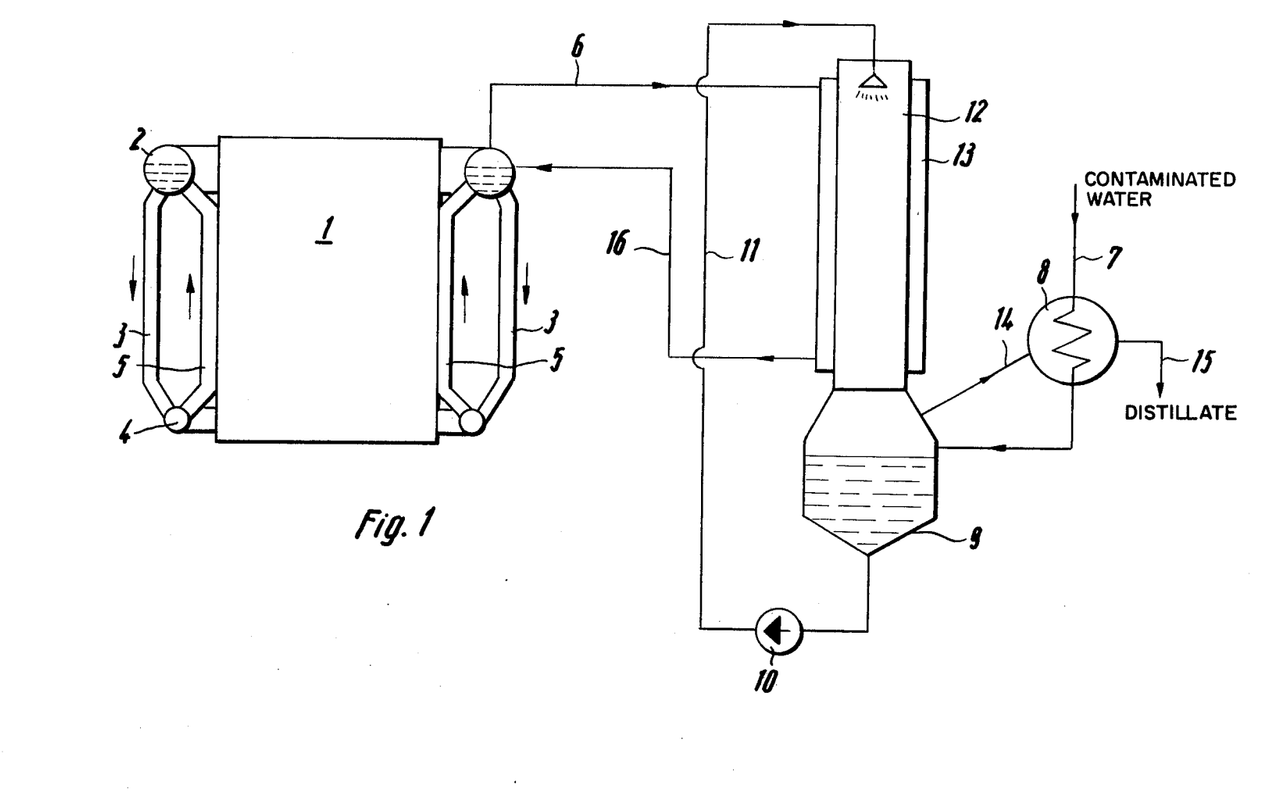
FIG. 1 is a diagrammatic illustration, resembling a flow diagram and showing the operation of the invention.

Referring now to the drawing in detail, it will be seen that FIG. 1 shows that the wall of the blast furnace 1 is cooled with water which is available in an annular container 2. The water flows for instance in a gravity system through individual outer conduits 3 which are not in direct contact with the furnace, in a downward flow until it reaches an annular collecting conduit 4 from which it rises in individual cooling conduits 5 which are in heat exchange contact with the furnace. The water in these conduits 5 becomes heated and partially converted into steam, and returns into the container 2.

The saturated steam which collects in the container 2 as a result of the water cooling of the furnace 1, and which has a gauge pressure of approximately 0.5 atmospheres and a temperature of approximately 110° C, is supplied to a distillation installation or plant via a conduit 6. The plant is strongly simplified in FIG. 1. The water to be distilled, for example river water or sea water, travels through a conduit 7 and a heat exchanger 8 into a container 9 from where it is supplied via a pump 10 and the conduit 11 to an evaporator 12. The evaporator 12 is heated by indirect heat exchange with a steam chamber 13 which receives steam from the cooling system of the furnace 1 through the conduits 6. A portion of the water admitted into the evaporator 12 becomes evaporated therein, and the non-evaporated water collects again in the container 9. The vapor formed in the evaporator 12 is withdrawn from the container 9 through the conduit 14 and is at least partially condensed in the heat exchanger 8. The distillate is available in the conduit 15, that is it can be used for example as boiler feed water or the like.

The vapor produced in the heat exchanger 12 is used in multiple-stage distillation plants for heating of the next distillation stage. Only the vapor of the last distillation stage is in this case used for preheating of the feed water and is then supplied for condensation purposes into a heat exchanger.

The condensate of the steam derived from the cooling system of the furnace 1, which forms in the steam chamber 13, is returned via the conduit 16 into the annular container 2. This means that the cooling of the furnace 1 takes place in a closed cooling circuit, and the removed heat is economically employed in form of heat of condensation in the distillation plant. This affords significant economic advantages, since the distillation plant can now operate without having to have its own source of heat. Various construction principles can be employed in constructing the distillation plant. For example, distillation can be in form of falling-film distillation, forced-turnover distillation, natural-flow distillation or expansion distillation. Thus, not only river water but also other types of liquids such as salt water and generally any aqueous solution can be distilled.

Figure 2:
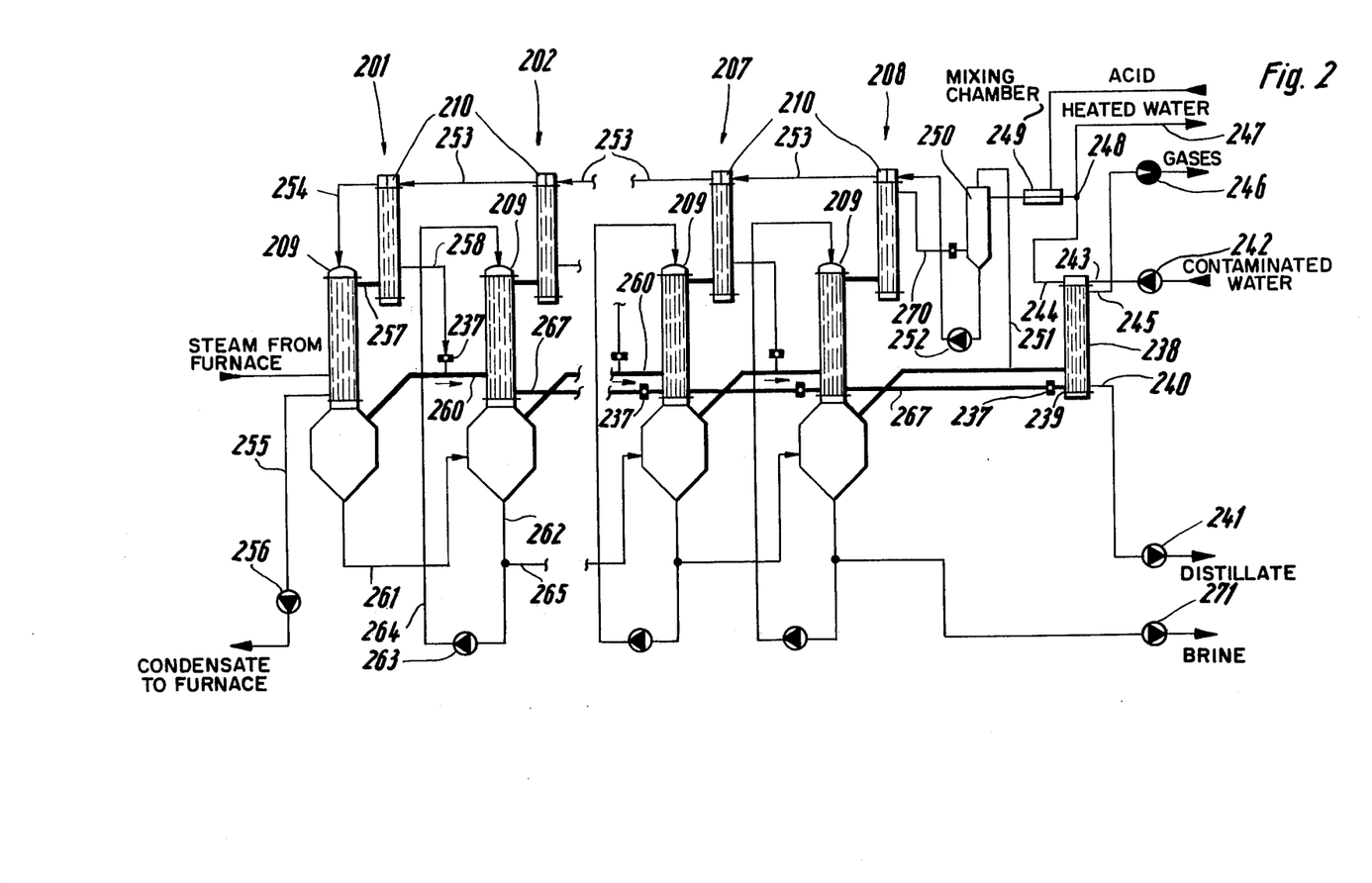
FIG. 2 illustrates the flow diagram of the distillation plant that is diagrammatically shown in FIG. 1.

FIG. 2 shows in more detail how such a distillation plant may be constructed. The exemplary distillation plant in FIG. 2 is composed of eight identical stages 201-208, which all are of the same construction. For this reason, and to avoid confusion, only the stages 201 and 202 are shown, together with the stages 207 and 208. The stages 203-206 should be understood to be identical with the ones shown. Each of the stages is composed of a column 209 and a preheater 210. The columns 209 correspond to the columns 12, 13 shown in FIG. 1.

Figure 3:
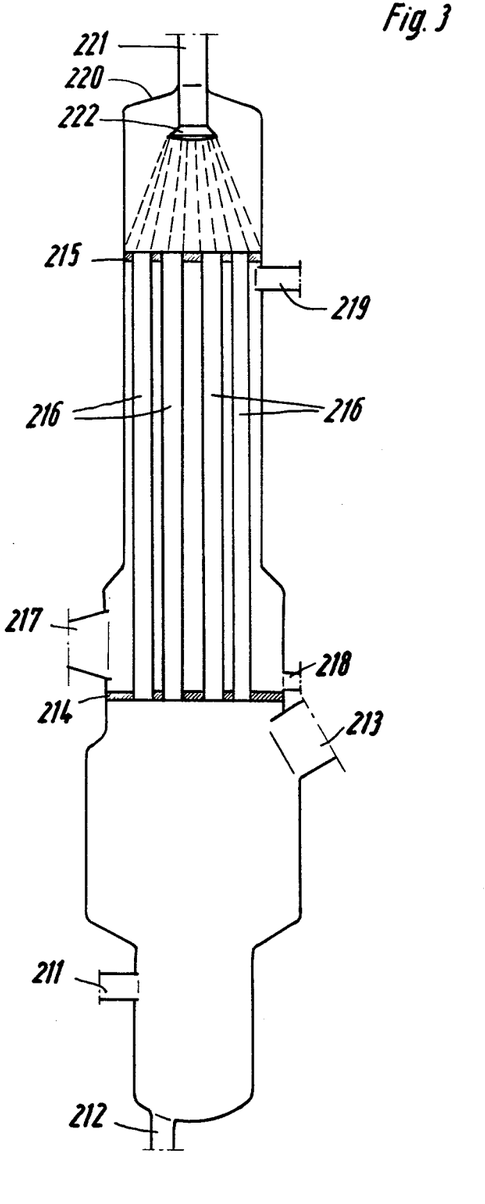
FIG. 3 illustrates a column of the distillation plant in FIG. 2.

FIG. 3 shows clearly that each of the columns 209 is subdivided into three sections, the lower section of which is composed of a cupped housing that is formed in the lower region with a lateral port 211, in the upper region with a lateral port 213, and in the bottom with a port 212. Connected with the lower section is a middle section which has a cylindrical circumferential wall, a lower plate 214 and an upper plate 215 through which bundles of tubes 216 extend. Above the lower plate 214 a port 218 is provided in the circumferential wall, and above this port there is a further port 217. The middle portion forms a heat exchanger into which steam enters through the port 217, to yield its heat of condensation to the tubes 216 through which the liquid to be distilled flows, and whereupon the steam is partially removed as a condensate through the port 218 and partly as steam through a port 219 located beneath the plate 215. Above the middle section is an upper section of the column, which also has a cup-shaped housing 220 provided with a port 221, on the downwardly located section of which there is provided a nozzle 222. The steam removed via the port 219 is supplied to the preheater 210 shown in FIG. 2.

Figure 4:
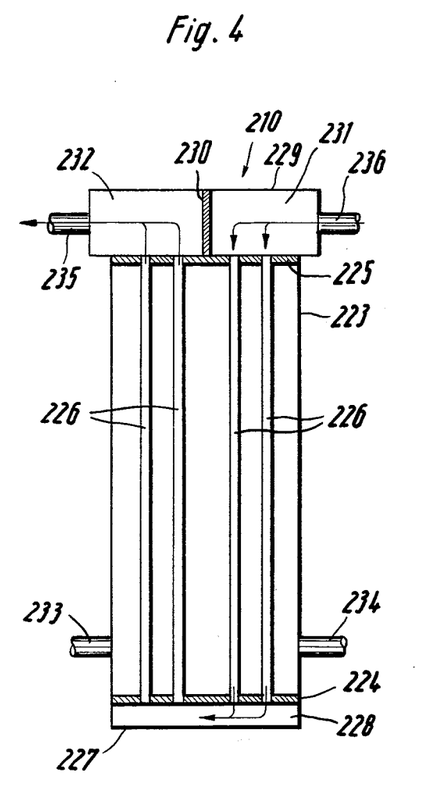
FIG. 4 illustrates a preheater of the distillation plant in FIG. 2.

As FIG. 4 shows, the preheater 210 has a cylindrical housing 223 accommodating two plates 224 and 225 through which another bundle of tubes 226 extends. The bottom 227 of the housing and the lower plate 224 form a chamber 228. Mounted on the upper plate 225 is a cupped housing 229 which separates the space surrounded between it and the upper plate into two compartments 231 and 232, by means of a plate 230.

The steam is supplied to the preheater 210 via a port 233 and the condensate is removed via a port 234. The contaminated water to be heated is supplied via a port 236 and removed via a port 235.

Figure 5:
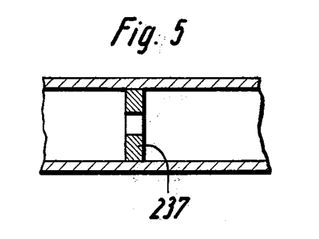
FIG. 5 is a fragmentary sectional view of a baffle plate.

Baffle or throttle plates 237 are accommodated in the conduits connecting the several stages, in order to be able to select the partial pressures. FIG. 5 shows that these plates 237 are accommodated in the respective conduits (one shown) and are formed with a bore which is smaller than the inner diameter of the conduit in which the plate 237 is accommodated.

FIG. 2 shows that the eighth and last stage 208 is followed by a surface condenser 238 which has the same construction as the preheater shown in FIG. 4. This surface condenser 238 has an inlet port 239 and an outlet port 240. The condensate distillate from all stages is supplied to the port 239, to be subjected to a final cooling in the surface condenser 238 and to be removed via the port 240 by means of a pump 241.

To obtain cooling of the distillate in the surface condenser 238, the water to be cleaned and distilled is supplied to the surface condenser via a pump 242 and a port 243, to flow through the surface condenser 238 and to be removed from the same via a port 244. Since this water contains substantial quantities of entrained gas, which is liberated during heating, a further conduit 245 is provided via which a water ring pump 246 withdraws the gases that are liberated.

The contaminated water which flows out through the port 244 is branched at a juncture 248 into two streams of which one flows via a conduit 247; the water of this stream has served only as cooling water for the surface condenser 238 and is removed out of the system. The other, preheated stream is admitted into a chamber 249 which is located downstream of the juncture 248 where it becomes admixed with sulfuric acid in order to convert the compounds which tend to form boiler scale, into readily soluble sulfates. Subsequently, this non-purified stream flows through a degassing vessel 250, from which the last amounts of gas are withdrawn via a conduit 251 and the surface condenser 245 by means of the water ring pump 246.

The water is withdrawn from the degassing vessel 250 by means of a pump 252 and supplied to the preheater 210 of the eighth stage 208, from where it sequentially flows via conduit sections 253 to the several preheaters of the stages 207-201, to become progressively heated. It leaves the preheater of the stage 201 via a conduit 254 and flows via the conduit 221 (compare FIG. 3) into the column of the first stage 201, as also seen in FIG. 2 then through the bundle of tubes 216 wherein it becomes heated and partially vaporized to enter into the lower section of the first column.

The energy required for heating and partial vaporizing of the contaminated water is obtained from the steam of the furnace which is supplied via the port 217 of the stage 201, which steam becomes partially condensed and is withdrawn via the port 218 and a conduit 255 by means of an interposed pump 256, to be returned to the furnace cooling system. The remaining quantity of the furnace steam is supplied via a port 219 of this stage 201 and via a conduit 257 and the port 233 to the preheater 210 of this stage 201, yields up its heat of condensation, leaves the preheater 210 via the port 234 and then flows via a conduit 258 and via the throttle plate 237 into a conduit 260 and from there into the port 217 of the next-following column 202. The conduit 260 on the one hand constitutes the connection with the port 213 of the first stage 201 and the port 217 of the column of the second stage 202. In the lower portion of the column of the first stage 201 there is accommodated the heated contaminated water as well as the vapor liberated there from. The heated contaminated water travels via a conduit 261 that communicates with the port 211 into the lower part of the column of the second stage 202. A conduit 262 which communicates with the port 212 of the column of the second stage 202 forwards a partial stream of this preheated contaminated water by means of a pump 263 into a conduit 264 which commmunicates with the port 221 of the column of the second stage 202, to be circulated to the nozzle 220. A second partial stream is withdrawn via a conduit 265 from the conduit 262, and is supplied into the column of the next stage 203 via the port 211. In this column, the division of the stream of heated contaminated water into two partial streams is then repeated, of which one is made to travel in a circuit and the other is supplied to the next column. This is repeated throughout all of the columns. The vapor produced in the column of the first stage 201 is supplied via the conduit 260 and the port 217 of the column of the second stage 202 to the latter, yields to the bundle of tubes therein a part of its heat of condensation; the distillate flows via a conduit 267 communicating with the port 218 of the second stage 202 through a throttling plate 237, then via a further port (not shown in FIG. 2) into the center section of the next-following stage 203, and this is repeated from stage to stage. Finally, the total distillate of all of the stages flows via the last conduit section 267 and the throttling plate 237 into the surface condenser and is removed via the pump 241.

The vapor is supplied via the port 219 of each stage and the conduit section 257 into the preheater of the next stage, condensed and then the distillate is supplied via the conduit section 258 and a throttling plate 237 into the corresponding conduit section 260.

In the first stage 201, the conduit section 257 supplies the remaining non-condensed quantity of steam into the preheater of the second stage 202 —it will be noted that in the first stage 201 the contaminated water is not made to travel in a circuit—; the final stage 208 differs from the preceding stages in that the preheater 210 of the final stage 208 is connected with a conduit 270 which communicates with its outlet port, so that the remaining steam and any gases that might be present can be withdrawn into the degassing vessel 250.

The concentrated liquid (the brine) is withdrawn from the last stage 208 via the pump 271. The dimensions of the bores in the individual throttle plates 237 are so selected that the desired partial pressures develop in the successive stages. It must be taken into account that the temperatures of the successive stages in direction from the first to the eighth stage, and therefore also the partial pressures, decrease, and that due to the cooling of the surface condenser 238 the evacuation of the arrangement which is necessary for proper operation takes place. These are details which are known from the prior art and therefore require no specific discussion. The column is very diagrammatically illustrated in FIG. 1 and despite the fact that the different reference numerals have been used it should be understood that it is identical with the column shown in FIG. 3. The same is also true with respect to FIG. 5.

Figure 6:
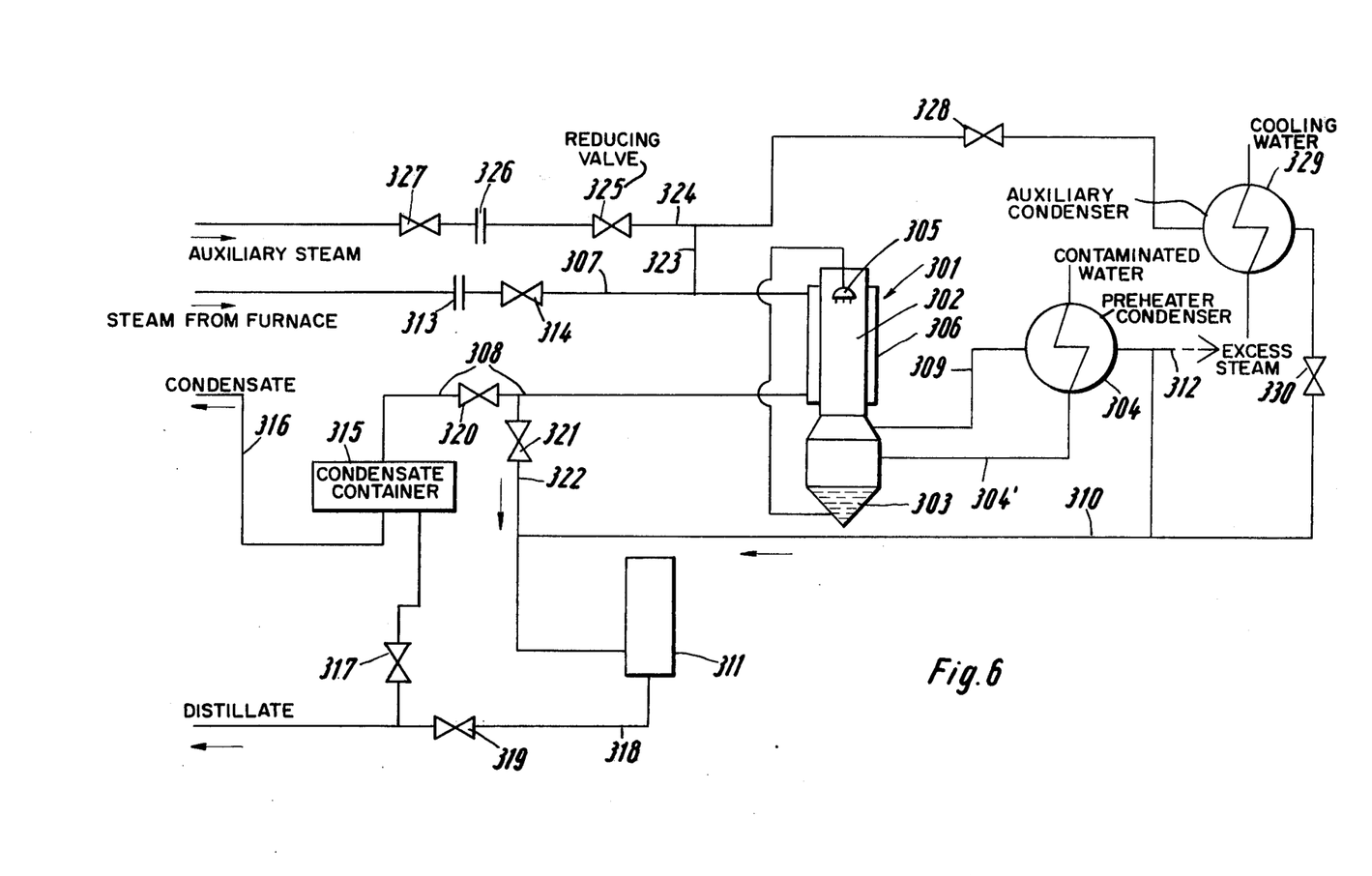
FIG. 6 is a diagrammatic view illustrating an overall installation according to the present invention wherein the distillation plant receives an auxiliary amount of steam from the steam system of a plant or factory of which the arrangement according to the present invention is a part.

FIG. 6 shows a combined system utilizing a furnace and a distillation plant, wherein the differential quantity of steam —that is the amount of steam that cannot be supplied by the cooling system of the furnace — is supplied via the steam system of a plant of which both the furnace and the distillation plant form a part. The used distillation plant is shown diagrammatically in FIG. 2. The arrangement in FIG. 6 serves to process contaminated river water so that the processed water can be used for other purposes, for instance as boiler feed water or the like. The distillation column here has an evaporator 302 a collecting container 303 of which is connected via a conduit 304' and a heat exchanger 304 with the supply of river water to be processed. From the container 303 the river water is supplied via a non-illustrated pump to the upper part of the evaporator 302 and is sprayed via nozzles 305 into the evaporator. A steam chamber 306 is arranged concentric to the evaporator and is connected with a steam supply conduit 307 of the furnace which is not illustrated in this Figure, and with a conduit 308 via which the condensate is evacuated from the steam chamber 306. The steam admitted into the steam chamber 306 condenses and yields its heat of condensation which is supplied essentially to the river water that is sprayed into the evaporator 302.

A part of the river water flashes into vapor and the latter travels via a conduit 309 into the heat exchanger 304 wherein a part of this vapor condenses the distillate and flows through a conduit 310 into a distillate container 311, to leave the same via a conduit 318 and through a valve 310 for travel to a non-illustrated user. The user may, for example, be a cold rolling system, that is an installation wherein iron or steel is subjected to cold rolling and wherein the distilled water is required. The steam which is not condensed in the heat exchanger 304 travels via a conduit 312 into the next non-illustrated distillation column. The distillation column 301 diagrammatically represents the same system as shown in FIG. 2.

Accommodated in the conduit 307 illustrated in FIG. 6 through which the steam derived from the cooling system of the furnace is supplied, is a measuring arrangement 313 and downstream thereof a shutoff valve 314 or a similar arrangement. The conduit 308 through which the condensate formed in the steam chamber is recirculated, leads to a condensate container 315 and has interposed in it another shutoff valve 320. The condensate container 315 is connected with the cooling system of the furnace via a conduit 316 and a non-illustrated pump. The condensate container 315 is connected via a valve 317 with the conduit 318 leading to the user, which conduit 318 is provided with the valve identified with reference numeral 319. A further valve 321 is interposed in a conduit 322 which leads from a section of the conduit 308 intermediate the valve 320 and the steam chamber 306 to the conduit 310, thus communicating with the distillate container 311.

A conduit 323 leads from a section of the conduit 307 located intermediate the valve 314 and the steam chamber 306, to an auxiliary conduit 324 which in turn is connected via a pressure reducing valve 325, and measuring device 326 and a shutoff valve 327 with a non-illustrated steam supply network of the plant or factory, which is also connected with the conduit 310 via a shutoff valve 328, an auxiliary condenser 320 and a valve 330.

Under ideal operating conditions, the amount of steam received from the cooling system of the furnace will be sufficient to produce a predetermined amount of distillate. This amount of steam is supplied to the steam chamber 306 where it becomes condensed, the condensate flows into the condensate containeer 315 and from there back to the cooling system of the furnace. Under these operating conditions the valves 314 and 320 are opened whereas the valves 321, 317, 327 and 328 are closed.

If too much water accumulates in the steam chamber 306, the excess quantity is vented via the valve 317 which is opened for this purpose. This is the case if the furance supplies too little steam and additional steam is derived via the auxiliary steam supply conduit from the general steam supply circuit of the factory.

The amount of steam that is received from the cooling system of the furnace is constantly sensed by the measuring device 313.

The distillate which is derived from the contaminated river or similar water is supplied to the distillate container 311.

In the event that the amount of steam furnished by the cooling system of the furnace is not sufficient to operate the distillation plant in such a manner as to obtain the amount of distillate per unit of time for which the plant is constructed, that is if the steam derived from the furance drops below a predetermined reference value, the difference is made up by admitting a corresponding amount of auxiliary steam from the steam supply circuit of the factory via the conduit 324, 323. Since normally the steam supply circuit of the factory will be at a higher pressure than the steam derived from the furnace, the pressure reducing valve 325 is provided. In this operating condition the valves 327 and 321 are additionally opened. As a result thereof, steam travels from the factory steam supply circuit via the conduit 323 into the steam chamber 306, at least partially yields up its heat of condensation, condenses and travels via the open valves 320 and 321 as condensate into the condensate container 315 or distillate container 311.

If, however, the furnace must be shut down for any reason, then the distillation plant can be operated exclusively by means of steam derived via the conduits 324, 323. In this case the valves 314 and 320 must be closed. Similar conditions obtain when the distillation plant is started up or shut down, in order to avoid damage such as might result from water hammering or the like.

In the event that the distillation plant itself should have to be shut down for any reason, care must be taken to assure that the furnace will be properly cooled. For this purpose the further supply of steam via the conduits 324, 323 is terminated by closing the valve 327, whereas the valves 328, 330, 319 and 317 must be opened. As a result of this heat is yielded up by the steam from the furnace into the auxiliary condenser 329, or in a distillation column which may be switched into the system in lieu of the condenser 329.

The measures according to the present invention assure that in the event of breakdown or other difficulties in operation of the distillation plant, the cooling of the furnace 1 continues as before, and that, on the other hand, in the event the furnace itself should have to be shut down, the production of distillate continues and damage to the distillation plant is avoided. In steady-state operation the invention further assures that the distillation plant operates under optimum conditions, independently of fluctuations in the steam supplied from the cooling system of the furnace or from the steam supply circuit of the factory. The invention also assures that even where new plant construction is contemplated, the essential unknown operating conditions of a new furnace being erected, that is the amount of steam that can be expected from its cooling system, can be appropriately taken into account.

It will be understood that each of the elements described above, or two or more together, may also find a useful application in other types of constructions differing from the types described above.

While the invention has been illustrated and described as embodied in the distillation of liquids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an arrangement for supplying heat to a distillation installation, a combination comprising a furnace having external walls; a cooling system for cooling said walls by a supply of cooling water; first conduit means connecting said cooling system with a heating side of the distillation installation for supplying steam generated during the cooling of said walls in said cooling system to the distillation installation; an auxiliary steam supply supply conduit connected with the heating side of the distillation installation for supplying auxiliary steam to the latter; means for effecting indirect heat exchange in said distillation installation between steam at the heating side thereof and a liquid to undergo distillation to thereby condense the steam and evaporate volatile components from the liquid; second conduit means connecting the heating side of the distillation installation with said cooling system of said furnace for returning the steam condensate to said cooling system in an amount which replenishes the supply of cooling water therein; first measuring means incorporated in said first conduit means for determining any deviation in the amount of the steam flowing therethrough from a preset reference value; second measuring means incorporated in said auxiliary steam supply conduit for determining the amount of auxiliary steam flowing therethrough; shutoff valves interposed in said first and second conduit means and in said auxiliary steam supply conduit and operative for controlling the flow of the steam through said first conduit means, the flow of the auxiliary steam through said auxiliary steam supply conduit in dependence on the deviation determined by said first measuring means to supply to the heating side of the distillation installation an amount of auxiliary steam equal to such deviation, and the return flow of the steam condensate to said cooling system of said furnace.

2. A combination as defined in claim 1; and further comprising a pressure reducing valve interposed in said auxiliary steam supply conduit.

3. A combination as defined in claim 1; and further comprising a condensate receptacle interposed in said second conduit means intermediate the shutoff valve therein and said furnace.

4. A combination as defined in claim 3; and further comprising a valve for connecting said condensate receptacle with a user.

5. A combination as defined in claim 1, wherein said distillation plant includes a distillate container; and further comprising an auxiliary condenser, and means for connecting the same with said distillate container.

6. The method defined in claim 1, said step of cooling a furnace with cooling water comprising cooling a blast furnace with cooling water.

7. A method of supplying heat to a distillation installation for distilling liquids, especially water and aqueous solutions, comprising the steps of cooling a furnace with cooling water by indirect heat exchange; employing the amount of steam which develops during said cooling step as a heat carrier from the furnace to the distillation installation; sensing deviations of the steam amount from a reference value; introducing into the distillation installation an amount of auxiliary steam which depends on the sensed deviations; recovering at least a part of the heat content of the steam and auxiliary steam by condensing the same by indirect heat exchange in the distillation installation; utilizing the recovered heat content in the distillation installation for evaporating volatile components from the liquids undergoing distillation therein; recirculating a part of the condensate, which is obtained in said heat recovering step, from the distillation installation to the furnace for replenishing the supply of the cooling water; and charging the remainder of the condensate from the distillation installation for use as boiler feed water.

8. A method as defined in claim 1, wherein the steam is low pressure steam at approximately 0.5 atmospheres gauge and a temperature of substantially 110° C.

9. In an arrangement as defined in claim 1, said furnace being a blast furnace.

* * * * *